(12) United States Patent
Song

(10) Patent No.: US 11,253,100 B2
(45) Date of Patent: Feb. 22, 2022

(54) ELECTRIC HEATER AND ELECTRIC HEATING APPARATUS HAVING SAME

(71) Applicant: LG ELECTRONICS INC., Seoul (KR)

(72) Inventor: Misun Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 305 days.

(21) Appl. No.: 16/591,319

(22) Filed: Oct. 2, 2019

(65) Prior Publication Data

US 2020/0113378 A1    Apr. 16, 2020

(30) Foreign Application Priority Data

Oct. 11, 2018 (KR) .................. 10-2018-0121047

(51) Int. Cl.

| | |
|---|---|
| *H05B 3/10* | (2006.01) |
| *H05B 3/16* | (2006.01) |
| *H05B 3/26* | (2006.01) |
| *H05B 3/68* | (2006.01) |
| *A47J 36/24* | (2006.01) |
| *H05B 3/03* | (2006.01) |
| *H05B 3/20* | (2006.01) |
| *H05B 3/74* | (2006.01) |
| *F24C 7/08* | (2006.01) |

(52) U.S. Cl.

CPC ............ *A47J 36/2483* (2013.01); *H05B 3/03* (2013.01); *H05B 3/20* (2013.01); *H05B 3/265* (2013.01); *H05B 3/68* (2013.01); *H05B 3/748* (2013.01); *F24C 7/088* (2013.01); *H05B 2203/003* (2013.01); *H05B 2203/016* (2013.01)

(58) Field of Classification Search
None
See application file for complete search history.

(56) References Cited

U.S. PATENT DOCUMENTS

| | | | | |
|---|---|---|---|---|
| 5,177,341 A | * | 1/1993 | Balderson | ................ H05B 3/26 |
| | | | | 219/543 |
| 6,018,149 A | * | 1/2000 | Higgins | ............... H05B 1/0266 |
| | | | | 219/443.1 |
| 6,043,467 A | * | 3/2000 | Little | ................... H05B 1/0269 |
| | | | | 219/542 |

(Continued)

FOREIGN PATENT DOCUMENTS

| | | |
|---|---|---|
| CN | 1248384 A | 3/2000 |
| CN | 102917484 A | 2/2013 |

(Continued)

*Primary Examiner* — Joseph M. Pelham
(74) *Attorney, Agent, or Firm* — Dentons US LLP

(57) ABSTRACT

An electric heater includes a substrate, a first outer pattern part disposed on one surface of the substrate and to connect with a pair of first electrodes, a second outer pattern part to connect with the pair of first electrodes in parallel with the first outer pattern part and to be spaced apart from the first outer pattern part, and an inner pattern part disposed on one surface of the substrate so as to be located such that the first outer pattern part and the second outer pattern part surround the inner pattern part, to be spaced apart from the first outer pattern part and the second outer pattern part, and to connect with a pair of second electrodes spaced apart from the pair of first electrodes.

20 Claims, 5 Drawing Sheets

(56) References Cited

U.S. PATENT DOCUMENTS

| | | |
|---|---|---|
| 8,143,557 B2 | 3/2012 | Shibata et al. |
| 2002/0088111 A1* | 7/2002 | Von Arx .............. A47J 36/2461 |
| | | 29/611 |
| 2003/0044173 A1* | 3/2003 | Natsuhara .............. H05B 3/265 |
| | | 392/479 |
| 2003/0075537 A1* | 4/2003 | Okajima ........... H01L 21/67103 |
| | | 219/444.1 |
| 2004/0074893 A1* | 4/2004 | Wermbter .............. H05B 3/748 |
| | | 219/465.1 |
| 2010/0193502 A1 | 8/2010 | Kim et al. |
| 2010/0224620 A1 | 9/2010 | Shibata et al. |
| 2014/0284320 A1 | 9/2014 | Nobori et al. |
| 2015/0163863 A1* | 6/2015 | Wegener .............. H05B 1/0236 |
| | | 219/202 |
| 2019/0182908 A1 | 6/2019 | Oh et al. |
| 2020/0060468 A1* | 2/2020 | Song ........................ H05B 3/74 |
| 2020/0060469 A1* | 2/2020 | Song ...................... H05B 3/748 |
| 2020/0063972 A1* | 2/2020 | Song ........................ H05B 3/74 |
| 2020/0063974 A1* | 2/2020 | Song ...................... F24C 7/067 |
| 2020/0063976 A1* | 2/2020 | Song ........................ H05B 3/03 |
| 2020/0063977 A1* | 2/2020 | Song ........................ H05B 3/03 |
| 2020/0068664 A1* | 2/2020 | Song ........................ H05B 3/26 |
| 2020/0120759 A1* | 4/2020 | Song ...................... H05B 3/748 |
| 2020/0396801 A1* | 12/2020 | Unno ...................... H05B 3/283 |
| 2021/0243850 A1* | 8/2021 | Ishikawa ................ H01L 21/02 |

FOREIGN PATENT DOCUMENTS

| | | |
|---|---|---|
| EP | 0 228 808 A2 | 7/1987 |
| EP | 0930805 A2 | 7/1999 |
| EP | 1013148 B1 | 1/2002 |
| GB | 2322272 A | 8/1998 |
| JP | 08203660 A | 8/1996 |
| JP | 2003133032 A | 5/2003 |
| KR | 10-2009-0009600 A | 1/2009 |
| KR | 2009-0127195 A | 12/2009 |
| KR | 10-1139612 B | 5/2012 |
| KR | 10-1762159 B1 | 8/2017 |
| KR | 10-2017-0138304 A | 12/2017 |
| KR | 10-2018-0096413 A | 8/2018 |
| WO | 2009014333 A1 | 1/2009 |

* cited by examiner

ELECTRIC HEATER AND ELECTRIC HEATING APPARATUS HAVING SAME

CROSS-REFERENCE TO RELATED APPLICATION

This application claims the benefit of priority to Korean Patent Application No. 10-2018-0121047 filed on Oct. 11, 2018 with the Korean Intellectual Property Office, the entire contents of which is incorporated herein by reference.

BACKGROUND

The present disclosure relates to an electric heating apparatus, and to an electric heater having a plane heating element.

An electric heating apparatus is an apparatus provided for heating, and includes an electric heater using a Joule's heat generated as a current flows through a resistance wire or the like, and an electric heater generating heat by visible light or infrared light.

The electric heating apparatus may be a cooking device such as a cooktop stove, an electric range, etc., to heat food or a container (hereinafter, referred to as a heating object) by generating heat using electricity. Recently, the electric heater using a plane heating element has gradually increased.

An example of such electric heater is disclosed in Korean Patent Registration No. 10-1762159 B1 (issued on Aug. 4, 2017). The plane heating electric heater includes a substrate including a surface formed of a material having an electric insulating property, a heating element attached to the surface of the substrate and disposed in a specific shape, and a power supply to supply electricity to the heating element.

In the above-described electric heater, the temperature distribution of the heating object may be varied depending on the shape or a pattern in which the plane heating element is disposed. Preferably, the plane heating element is formed in the shape or pattern for heating the heating object as uniformly as possible.

The plane heating element of the electric heater may include a plurality of track parts having a straight line or an arc shape, and adjacent track parts of the plurality of track parts may have the shape of that of the adjacent track parts, and are connected with each other through a bridge part (or track part).

In another example of the heater, there is a temperature sensitive device disclosed in EP 0, 228, 808 A2 (published on Jul. 15, 1987). Such a device is configured to have a structure of a heater track, which is an electrically conductive material, and a pair of electrodes printed on a ceramic coating layer. As the current is supplied through the electrode, radiant heat may be generated from the heater track.

SUMMARY

One aspect is to provide an electric heater with reduced localized heating.

Another aspect is to provide an electric heater in which a heating temperature may be controlled.

The disclosure discloses an electric heater that may include a substrate; a first outer pattern part configured to be disposed on one surface of the substrate and to connect a pair of first electrode parts; a second outer pattern part configured to connect the pair of first electrode parts in parallel with the first outer pattern part and to be spaced apart from the first outer pattern part; and an inner pattern part configured to be disposed on one surface of the substrate so as to be located inside the first outer pattern part and the second outer pattern part, to be spaced apart from the first outer pattern part and the second outer pattern part, and to connect a pair of second electrode parts spaced apart from the pair of first electrode parts.

The width of each of the first outer pattern part and the second outer pattern part may be narrower than the width of the inner pattern part.

A gap between the first outer pattern part and the second outer pattern part may be constant.

The first outer pattern part may include a first base track connected to the first electrode part; a second base track spaced apart from the first base track; and a first base bridge connecting the first base track and the second base track in series. The second outer pattern part may include a first parallel track connected to the first electrode part and located between the first base track and the second base track; a second parallel track spaced apart from the first parallel track and located between the first parallel track and a second base track; and a first parallel bridge connecting the first parallel track and the second parallel track in series.

The length of the first base bridge may be longer than the length of the first parallel bridge.

A gap between the first parallel track and the second parallel track may be greater than a gap between the first base track and the first parallel track and a gap between the second base track and the second parallel track.

The first outer pattern part may further include a third base track spaced apart from the second base track; and a second base bridge connecting the second base track and the third base track in series. The second outer pattern part may further include a third parallel track located opposite the second parallel track with respect to the third base track; and a second parallel bridge which connects the second parallel track and the third parallel track in series.

The length of the second base bridge may be shorter than the length of the second parallel bridge.

The first base bridge may be spaced apart from the first parallel bridge and may surround the first parallel bridge, and the second parallel bridge may be spaced apart from the second base bridge and may surround the second base bridge.

A gap between the second base track and the third base track may be greater than a gap between the second base track and the second parallel track and a gap between the third base track and the third parallel track.

The second base bridge and the second parallel bridge may be curved to protrude toward the first electrode part.

The disclosure discloses an electric heater that may include a substrate; an outer pattern part configured to be disposed on one surface of the substrate and to connect a pair of first electrode portions; a first inner pattern part configured to be disposed on one surface of the substrate so as to be located inside the outer pattern part, to be apart from the outer pattern part, and to connect a pair of second electrode parts spaced apart from the pair of first electrode parts; and a second inner pattern part configured to connect to the pair of second electrode portions to the first inner pattern part in parallel and to be spaced apart from the first inner pattern part.

When, compared with a case where the base bridge and the parallel bridge form an integral bridge without being spaced apart from each other, the disclosure discloses an electric heater where a path difference between the inner circumference and the outer circumference of each of the base bridge and the parallel bridge may be relatively reduced. This has the advantage of reducing the localized heating generated in the base bridge and the parallel bridge.

According to the disclosure, any one of the inner plane heating element and the outer plane heating element may include a plurality of pattern parts connected in parallel to the electrode part, and the other of the inner plane heating element and the outer plane heating element may include a single pattern part connected to the electrode part in series. Therefore, the heating temperature of the plane heating elements including a plurality of pattern parts which are connected in parallel to each other may be relatively high, and there is an advantage that the heating temperature of the electric heater may be easily controlled according to whether the current is supplied to either the inner plane heating element or the outer plane heating element.

According to the disclosure, a potential difference between the parallel tracks and the base track adjacent to each other is relatively small, while a potential difference between the base tracks adjacent to each other or a potential difference between parallel tracks adjacent to each other may be relatively large. Thus, the gap between base tracks adjacent to each other and the gap between parallel tracks adjacent to each other may be wider than the gap between the parallel track and the base track adjacent to each other. This may minimize the risk of dielectric breakdown and maximize the heating area of the electric heater.

DETAILED DESCRIPTION OF THE EMBODIMENTS

Hereinafter, the embodiments of the present disclosure will be described in detail with reference to accompanying drawings.

In describing the components of the embodiment(s) of the present disclosure, terms such as first, second, A, B, (a), and (b) may be used. These terms are only for distinguishing the components from other components, and the nature, order or order of the components are not limited by the terms. If a component is described as being "connected", "coupled" or "connected" to another component, it should be understood that the component may be directly connected or connected to that other component, but having other components there between.

Figure 1:
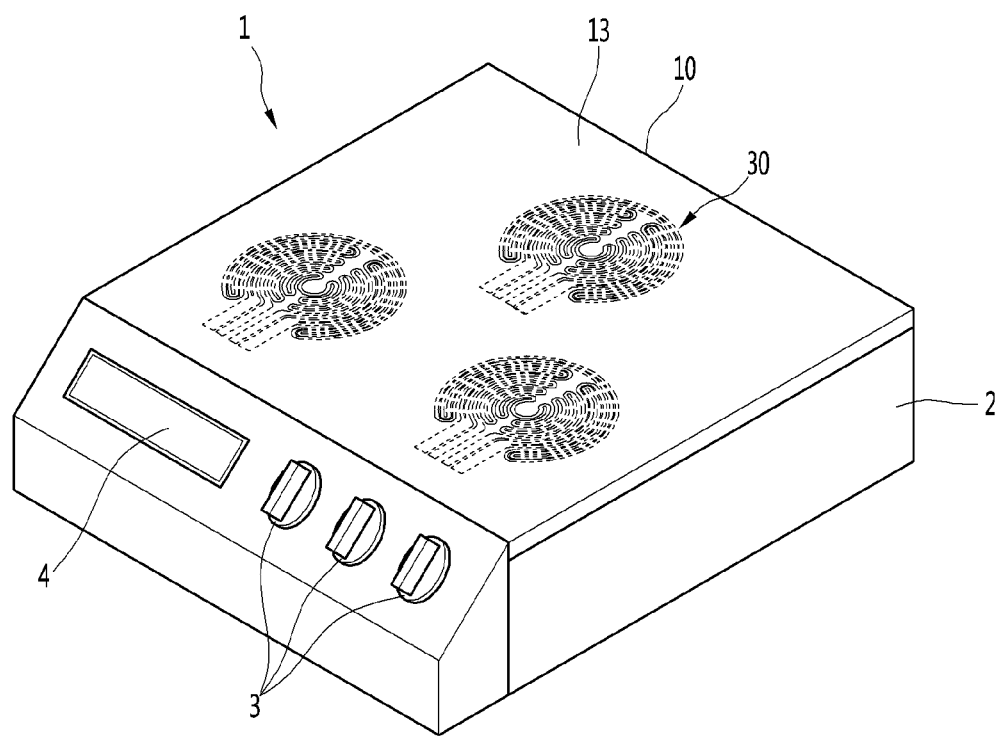
FIG. 1 is a perspective view showing an electric range employing an electric heater according to an embodiment of the present disclosure.
Figure 2:
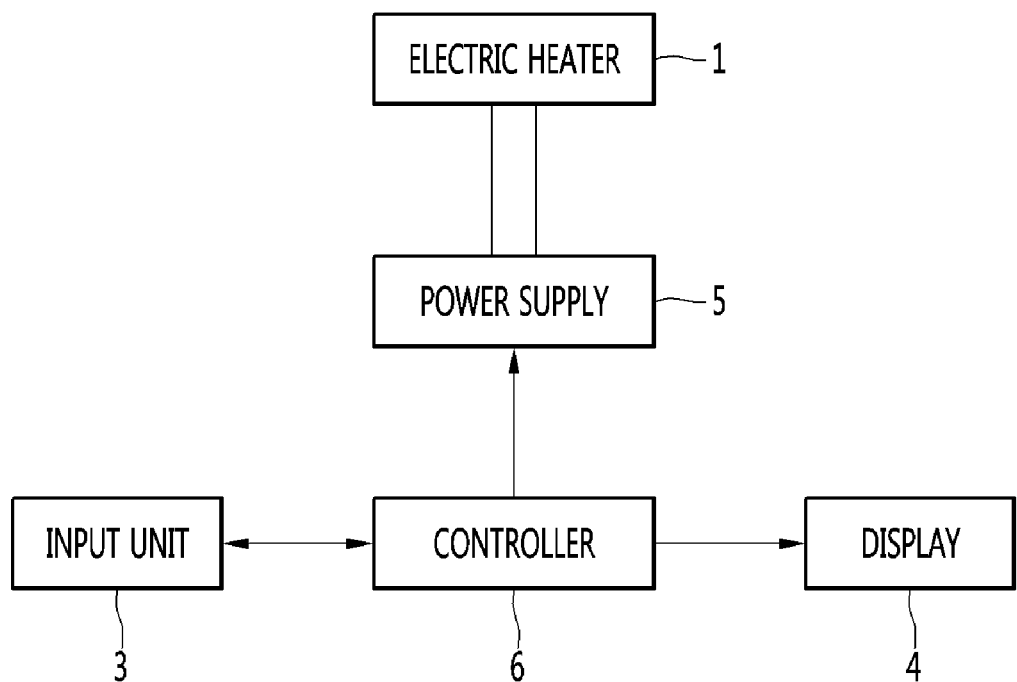
FIG. 2 is a control block diagram of an electric range employing an electric heater according to an embodiment of the present disclosure.

FIG. 1 is a perspective view showing an electric range employing an electric heater according to an embodiment of the present disclosure and FIG. 2 is a control block diagram of the electric range employing the electric heater according to an embodiment of the present disclosure. Although the electric heater shown is employed in an electric range, the electric heater may be employed in any electric heating apparatus.

The electric heater 1 may include some of an electric range (hereinafter, referred to as "electric range"), such as cooktop stove.

The electric range may include a cabinet 2 forming an outer appearance. The electric heater 1 may be disposed at an upper part of the cabinet 2. The cabinet 2 may have an open top surface, and the electric heater 1 may be disposed on the cabinet 2.

The electric range may include an input unit 3, which may be dials as shown, or may be touch buttons to manipulate the electric range, and a display 4 to display various information such as information of the electric range. The electric range may further include a power supply 5 connected to the electric heater 1 to supply current to the electric heater 1. The electric range may further include a controller 6 to control the power supply 5 and the display 4, depending on the input of the input unit 3. The controller 6 may be a microprocessor, an integrated circuit, an electrical circuit, a logical electrical circuit, and the like.

The electric heater 1 may be installed in the cabinet 2 such that the top surface of the electric heater 1 is exposed to the outside. The heating object heated by the electric range may be placed on the top surface of the electric heater and the top surface of the electric heater 1 may be a heating object seating surface on which the heating object is seated.

Figure 3:
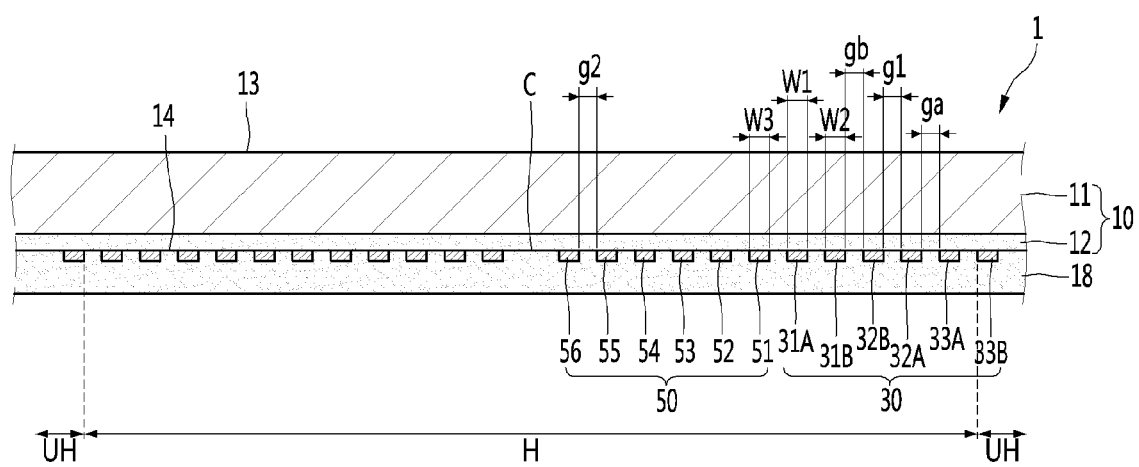
FIG. 3 is a cross-sectional view showing an electric heater according to a first embodiment of the present disclosure.

FIG. 3 is a cross-sectional view showing an electric heater according to a first embodiment of the present disclosure.

The electric heater 1 may include a substrate 10 and a first plane heating element 30 disposed on one surface of the substrate 10.

The substrate 10 may be, for example, an insulating substrate capable of forming a conductor pattern on the surface of the substrate 10. The top surface of the substrate 10 may be a heating object seating surface 13 on which the heating object is placed. The bottom surface of the substrate 10 may be a plane heating element surface 14 on which the first plane heating element 30 and a second plane heating element 50 to be described are disposed.

The substrate 10 may include only the base 11 formed of an insulating material in the entire portion thereof, or may include the base 11 formed of an insulating material or a non-insulating material and an insulating layer 12 disposed on one surface of the base 11.

The base 11 may include glass, and the insulating layer 12 may be disposed through coating or printing on the bottom surface of the glass or attached to the base 11.

The first plane heating element 30 may be directly disposed on one surface of the base 11 including the insulating material, or may be disposed on the insulating layer 12.

The base 11 may be formed in the shape of a plate on which the heating object is placed, and may be formed in the shape of a container in which the heating object may be received.

The insulating layer 12 may be disposed on the bottom surface of the base 11. The insulating layer 12 may be disposed on the entire portion of the bottom surface of the base 11 or on some of the bottom surface of the base 11. Alternatively, the insulating layer 12 may be disposed on an area in which the first plane heating element 30 and the second plane heating element 50 to be described are disposed. The insulating layer 12 may constitute the entire portion of the bottom surface of the substrate 10 or constitute some of the bottom surface of the substrate 10.

The first plane heating element 30 and the second plane heating element 50 may be disposed on the bottom surface 14 of the insulating layer 12. The first plane heating element 30 and the second plane heating element 50 may have a size smaller than a size of the substrate 10. The bottom surface of the base 10 may include a heating area H in which the first plane heating element 30 and the second plane heating element 50 are disposed, and a non-heating area UH around the heating area H.

The heater 1 may further include a coating layer 18 surrounding the first plane heating element 30 and the second plane heating element 50. The coating layer 18 may be formed of an electrically insulating material and may protect the first plane heating element 30 and the second plane heating element 50.

According to the present disclosure, the substrate 10 may include a flexible material, for example, a flexible insulating film. In this case, the electric heater 1 may be a flexible plane heater. It may be understood that such a flexible plane heater is attached to a member, on which the heating object is placed, to heat the heating object, which is similar to the top surface of the electric range.

Figure 4:
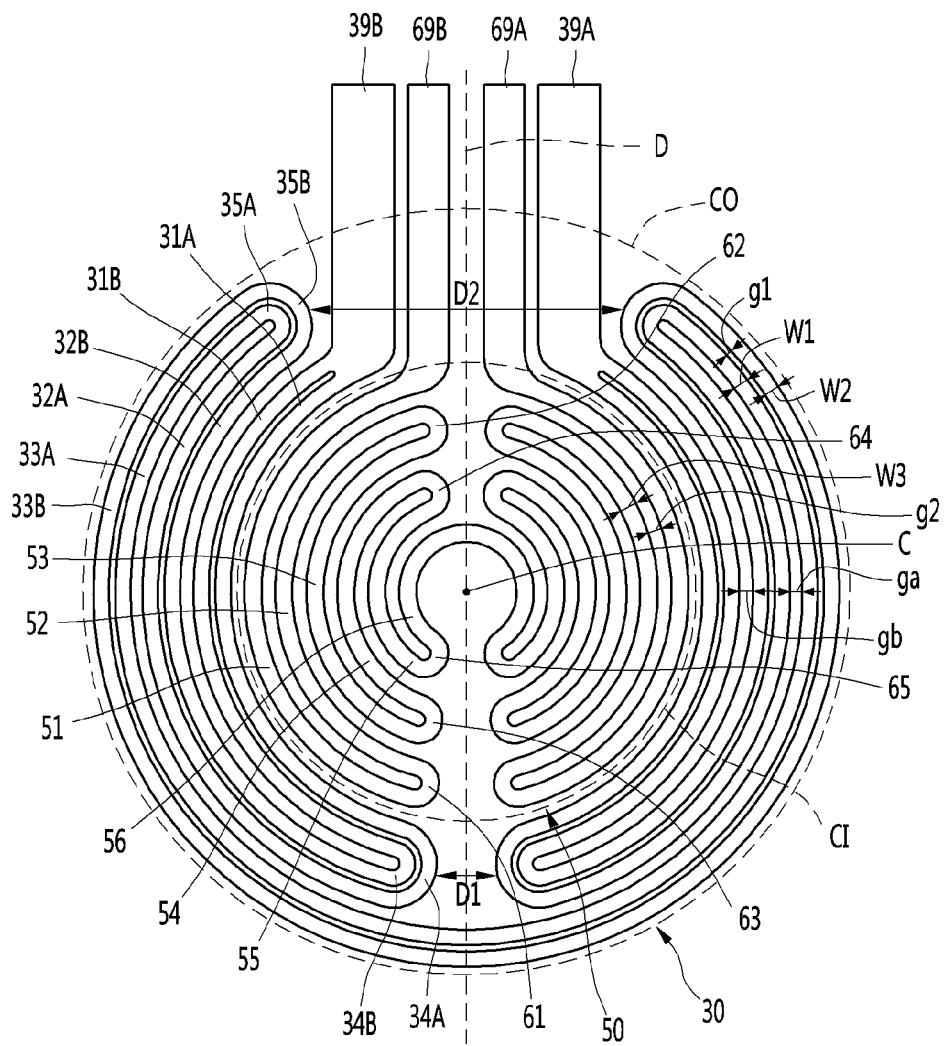
FIG. 4 is a bottom view showing an electric heater according to an embodiment of the present disclosure.

FIG. 4 is a bottom view showing an electric heater according to an embodiment of the present disclosure.

The inner direction described in this specification may be a direction toward the centers C of the first plane heating element 30 and the second plane heating element 50 and the outer direction may be a direction opposite to the inner direction. The centers of the first plane heating element 30 and second plane heating element 50 may be the centers of a first imaginary circle CI or a second imaginary circle CO to be described below.

The first plane heating element 30 may be located outside the second plane heating element 50. However, the present invention is not limited thereto. Hereinafter, the first plane heating element 30 may be referred to as an outer plane heating element, and the second plane heating element 50 may be referred to as an inner plane heating element.

The outer plane heating element 30 may include first electrode parts 39A and 39B and a plurality of pattern parts connected to the first electrode parts 39A and 39B.

More specifically, the outer plane heating element 30 may include first electrode parts 39A and 39B, first outer pattern parts 31A, 32A, 33A, 34A, and 35A connected to the first electrode parts 39A and 39B, and a second outer pattern part 31B, 32B, 33B, 34B, and 35B connected to the first electrode parts 39A and 39B and in parallel with the first outer pattern parts 31A, 32A, 33A, 34A, and 35A.

The first outer pattern parts 31A to 35A and the second outer pattern parts 31B to 35B may be located between the first imaginary circle CI and the second imaginary circle CO. In this case, the first imaginary circle CI and the second imaginary circle CO may be concentric. The diameter of the second imaginary circle CO may be larger than the diameter of the first imaginary circle CI. The inner pattern parts 51 to 56 and 61 to 65 to be described below may be located inside the first imaginary circle CI.

The first outer pattern parts 31A to 35A and the second outer pattern parts 31B to 35B may connect, respectively, and include respective start points and end points. Each of the start points and the end points of the first outer pattern parts 31A to 35A and the second outer pattern parts 31B to 35B according to the present embodiment may be a part which is connected to the respective first electrode parts 39A and 39B.

The first outer pattern parts 31A to 35A and the second outer pattern parts 31B to 35B may be formed to correspond to each other. The first outer pattern parts 31A to 35A and the second outer pattern parts 31B to 35B may not intersect with each other.

In addition, the first outer pattern parts 31A to 35A and the second outer pattern parts 31B to 35B may be spaced apart from each other. A gap g1 between the first outer pattern parts 31A to 35A and the second outer pattern parts 31B to 35B may be kept constant along the first outer pattern parts 31A to 35A and the second outer pattern parts 31B to 35B.

The first outer pattern parts 31A to 35A may include a plurality of base tracks 31A, 32A, and 33A and a plurality of base bridges 34A and 35A connecting the plurality of base tracks 31A, 32A, and 33A to each other in series.

The second outer pattern parts 31B to 35B may include a plurality of parallel tracks 31B, 32B, and 33B and a plurality of parallel bridges 34B and 35B connecting the plurality of parallel tracks 31B, 32B, and 33B to each other in series.

The base tracks 31A, 32A, and 33A and the parallel tracks 31B, 32B, and 33B may be collectively referred to as an outer track. The base bridges 34A and 35A and the parallel bridges 34B and 35B may be collectively referred to as an outer bridge.

Each of the base tracks 31A, 32A, and 33A and the parallel tracks 31B, 32B, and 3B may have a curved shape. More specifically, each of the base tracks 31A, 32A, and 33A and the parallel tracks 31B, 32B, and 33B may have an arc shape. For instance, the base tracks 31A, 32A, and 33A and the parallel tracks 31B, 32B, and 33B may include a major arc shape having an arc angle of greater than 180 degrees, a minor arc shape having an arc angle of less than 180 degrees, and a semi-circular shape having an arc angle of 180 degrees. In addition, it may be possible for the base tracks 31A, 32A, and 33A and the parallel tracks 31B, 32B, and 33B to include a combination of two or more of the minor arc shape, the semicircular shape, and the major arc shape.

Through the combination of arc shapes, the base tracks 31A, 32A, and 33A and the parallel tracks 31B, 32B, and 33B may be formed to be long in the circumferential direction of the second imaginary circle CO.

The centers of curvature C of the plurality of base tracks 31A, 32A, and 33A and the plurality of parallel tracks 31B, 32B, and 33B may coincide with each other. The centers of curvature C of the base tracks 31A, 32A, and 33A and the parallel tracks 31B, 32B, and 33B may be defined as the centers of the first outer pattern parts 31A to 35A and the second outer pattern parts 31B to 35B or the center of the outer plane heating element 30.

Each of the lengths of the plurality of base tracks 31A, 32A, and 33A may be different from each other. The widths W1 of the plurality of base tracks 31A, 32A, and 33A may be equal to each other. Each of the lengths of the plurality of parallel tracks 31B, 32B, and 33B may be different from each other. The widths W2 of the plurality of parallel tracks 31B, 32B, and 33B may be equal to each other.

The widths W1 of the base tracks 31A, 32A, and 33A and the widths W2 of the parallel tracks 31B, 32B, and 33B may be the same or similar to each other.

The widths W1 of the base tracks 31A, 32A, and 33A and the widths W2 of the parallel tracks 31B, 32B, and 33B may be different from the widths W3 of the inner tracks 51, 52, 53, 54, 55, and 56.

In the present embodiment, the widths W3 of the inner tracks 51 to 56 may be wider than each of the widths W1 of the base tracks 31A, 32A, and 33A and the widths W2 of the parallel tracks 31B, 32B, and 33B. The widths W3 of the inner tracks 51 to 56 may be narrower than the sum of the widths W1 of the base tracks 31A, 32A, and 33A and the widths W2 of the parallel tracks 3d1B, 32B, and 33B.

The plurality of base tracks 31A, 32A, and 33A and the plurality of parallel tracks 31B, 32B, and 33B may be spaced apart from each other. More specifically, the plurality of base tracks 31A, 32A, and 33A and the plurality of parallel tracks 31B, 32B, and 33B may be disposed to be spaced apart by a predetermined gap in the radial direction of the second imaginary circle CO.

A gap ga between the base tracks 31A, 32A, and 33A adjacent to each other may be equal to or similar to a gap gb between parallel tracks 31B, 32B, and 33B adjacent to each other.

A potential difference between the parallel tracks 31B, 32B, and 33B and the base tracks 31A, 32A, and 33A adjacent to each other may be relatively small. On the other hand, the potential difference between the base tracks 31A, 32A, and 33A adjacent to each other or the potential difference between parallel tracks 31B, 32B, and 33B adjacent to each other may be relatively large. Accordingly, a gap g1 between the parallel tracks 31B, 32B, and 33B and the base tracks 31A, 32A, and 33A adjacent to each other may be narrower than the gap gb between the base tracks 31A, 32A, and 33A adjacent to each other and the parallel tracks 31B, 32B, and 33B adjacent to each other, respectively.

The plurality of base tracks 31A, 32A, and 33A may include a first base track 31A, a second base track 32A located outside the first base track 31A, and a third base track 33A located outside the second base track 32A.

The first base track 31A may be connected to the first electrode parts 39A and 39B. A pair of first base tracks 31A may be provided that may be connected to the respective electrode parts 39A and 39B. At least a pair second base track 32A may be provided. One third base track 33A may be provided. The second base track 32A may be located between the first base track 31A and the third base track 33A in the radial direction.

The length of the second base track 32A is longer than the length of the first base track 31A and may be shorter than the length of the third base track 33A.

The plurality of parallel tracks 31B, 32B, and 33B may include a first parallel track 31B, a second parallel track 32B located outside the first parallel track 31B, and a third parallel track 33B located outside a second parallel track 32B.

The first parallel track 31B may be spaced apart from the first base track 31A and connected to the first electrode parts 39A and 39B.

A pair of first parallel tracks 31B may be provided that may be connected to the respective first electrode parts 39A and 39B. At least a pair of second parallel tracks 32B may be provided. One third parallel track 33B may be provided. The second parallel track 32B may be located between the first parallel track 31B and the third parallel track 33B in the radial direction.

The length of the second parallel track 32B is longer than the length of the first parallel track 31B and may be shorter than the length of the third parallel track 33B.

The first parallel track 31B and the second parallel track 32B may be located between the first base track 31A and the second base track 32A. The second parallel track 32B may be located between the first parallel track 31B and the second base track 32A.

The second base track 32A and the third base track 33A may be located between the second parallel track 32B and the third parallel track 33B. The third base track 33A may be located between the second base track 32A and the third parallel track 33B.

The plurality of base bridges 34A and 35A may connect the plurality of base tracks 31A, 32A, and 33A in series with respect to the current flow direction. The plurality of parallel bridges 34B and 35B may connect the plurality of parallel tracks 31B, 32B, and 33B in series with respect to the current flow direction.

The base bridges 34A and 35A may connect the end parts of the base tracks 31A, 32A, and 33A adjacent to each other. The parallel bridges 34B and 35B may connect the end parts of the parallel tracks 31B, 32B, and 33B adjacent to each other.

The plurality of base bridges 34A and 35A and the plurality of parallel bridges 34B and 35B may be spaced apart from each other.

The widths of the base bridges 34A and 35A may be equal to or narrower than the widths W1 of the base tracks 31A, 32A, and 33A. The widths of the parallel bridges 34B and 35B may be equal to or narrower than the widths W2 of the parallel tracks 31B, 32B, and 33B.

When comparing the above configuration with a configuration where the base bridges 34A and 35A and the parallel bridges 34B and 35B are not spaced apart from each other and form an integral outer bridge, in the above configuration, the path difference between the inner circumference and outer circumference of each of the base bridges 34A and 35A and the parallel bridges 34B and 35B may be relatively reduced. Therefore, the localized heating of the base bridges 34A and 35A and the parallel bridges 34B and 35B may be reduced.

In addition, when comparing with a configuration where the first outer pattern parts 31A to 35A and the second outer pattern parts 31B to 35B are not spaced apart from each other and form an integral outer pattern part, in the above configuration, the width of each of the first outer pattern parts 31A to 35A and the second outer pattern parts 31B to 35B may be reduced. Therefore, when current is supplied to the first electrode parts 39A and 39B, the heating value generated by the first outer pattern parts 31A to 35A and the second outer pattern parts 31B to 35B may be reduced, but the heating temperature may be relatively high.

The plurality of base bridges 34A and 35A may include a first base bridge 34A and a second base bridge 35A. The first base bridge 34A may connect the first base track 31A and the second base track 32A to each other. The second base bridge 35A may connect the second base track 32A and the third base track 33A.

The plurality of parallel bridges 34B and 35B may include a first parallel bridge 34B and a second parallel bridge 35B. The first parallel bridge 34B may connect the first parallel track 31B and the second parallel track 32B. The second parallel bridge 35B may connect the second parallel track 32B and the third parallel track 33B.

Each pair of the first base bridge 34A, the second base bridge 35A, the first parallel bridge 34B, and the second parallel bridge 35B may be provided.

The first base bridge 34A may be spaced apart from the first parallel bridge 34B and may surround the first parallel bridge 34B. The length of the first base bridge 34A may be longer than the length of the first parallel bridge 34B.

The second parallel bridge 35B may be spaced apart from the second base bridge 35A and surround the second base bridge 35A. The length of the second parallel bridge 35B may be longer than the length of the second base bridge 35A.

The pair of first electrode parts 39A and 39B may be connected to the first outer pattern parts 31A to 35A and the second outer pattern parts 31B to 35B. The first electrode parts 39A and 39B may be directly connected to the first outer pattern parts 31A to 35A and the second outer pattern parts 31B to 35B or may be connected by a connector.

The pair of first electrode parts 39A and 39B may include a first positive electrode part 39A and a first negative electrode part 39B. Either one of the first positive electrode part 39A and the first negative electrode part 39B may be connected to the start point of each of the first outer pattern parts 31A to 35A and the second outer pattern parts 31A to 35A and the other one thereof may be connected to the end point of each of the first outer pattern parts 31A to 35A and the second outer pattern parts 31A to 35A.

In the present embodiment, the start point of the first outer pattern parts 31A to 35A may be located at the end part of any one first base tracks 31A and the end point of the first outer pattern parts 31A to 35A may be located at the end part of the other first base track 31A. In addition, the start point of the second outer pattern parts 31B to 35B may be located at the end part of any one first parallel tracks 31B and the end point of the second outer pattern parts 31B to 35B may be located at end part of the other first parallel track 31B.

In other words, the end parts of any one first base track 31A and any one first parallel track 31B are connected to the first positive electrode part 39A, and the end parts of the other first base track 31A and the other first parallel track 31B may be connected to first negative electrode part 39B.

The widths of the first electrode parts 39A and 39B may be wider than the sum of the widths W1 of the base tracks 31A, 32A, and 33A and the widths W2 of the parallel tracks 31B, 32B, and 33B.

At least a part of the first electrode parts 39A and 39B may be located between the pair of second parallel bridges 35B. In more detail, the first electrode parts 39A and 39B may pass through between the pair of second parallel bridges 35B and thus extend to the outside the second imaginary circle C2.

The second base bridge 35A and the second parallel bridge 35B may be curved so as to protrude toward the first electrode parts 39A and 39B.

The distance D2 between the pair of second parallel bridges 35B may be wider than the distance D1 between the pair of first base bridges 34A. In this case, the distance between the bridges may be the distance between the most protruding portion of the outer circumference of each of the bridges.

The outer plane heating element 30 may have a symmetrical shape with respect to an imaginary center line D bisecting the outer plane heating element 30. Here, the imaginary center line D may be an imaginary straight line passing through the center C of the outer plane heating element 30.

More specifically, each of the first outer pattern parts 31A to 35A and the second outer pattern parts 31B to 35B may have a shape symmetrical with respect to the imaginary center line D.

The pair of first base tracks 31A may be located opposite to each other with respect to the imaginary center line D. The pair of first parallel tracks 31B may be located opposite to each other with respect to the imaginary center line D. The pair of second base tracks 32A may be located opposite to each other with respect to the imaginary center line D. The pair of second parallel tracks 32B may be located opposite to each other with respect to the imaginary center line D. The third base track 33A and the third parallel track 33B may intersect the imaginary center line D.

The first base bridge 34A and the first parallel bridge 34B may be curved so as to protrude toward the imaginary center line D.

The pair of first electrode parts 39A and 39B may be located opposite to each other with respect to the imaginary center line D.

The inner plane heating element 50 may include inner pattern parts 51, 52, 53, 54, 55, 56, 61, 62, 63, 64, and 65, and second electrode parts 69A and 69B connected to the inner pattern parts 51 to 56 and 61 to 65.

The inner pattern parts 51 to 56 and 61 to 65 may be located inside the first outer pattern parts 31A to 35A and the second outer pattern parts 31B to 35B. The inner pattern parts 51 to 56 and 61 to 65 may be located inside the first imaginary circle CI.

The inner pattern parts 51 to 56 and 61 to 65 may connect and include the start point and the end point. The start point and the end point of the inner pattern parts 51 to 56 and 61 to 65 according to the present embodiment may be parts which are connected to the pair of second electrode parts 69A and 69B.

The inner pattern parts 51 to 56 and 61 to 65 may include a plurality of inner tracks 51, 52, 53, 54, 55, and 56 and a plurality of inner bridges 61, 62, 63, 64, and 65 which connect the plurality of inner tracks 51, 52, 53, 54, 55, and 56 to each other in series.

Each of the inner tracks 51 to 56 may be curved. More specifically, each of the inner tracks 51 to 56 may have an arc shape. For instance, the inner tracks 51 to 56 may include a major arc shape having an arc angle of greater than 180 degrees, a minor arc shape having an arc angle of less than 180 degrees, or a semi-circular shape having an arc angle of 180 degrees. In addition, it may be possible that the inner tracks 51 to 56 include a combination of two or more of the major arc shape, the semicircular shape, and the minor arc shape.

Through the combination of arc shapes the inner tracks 51 to 56 may be formed to be long in the circumferential direction of the first imaginary circle CI.

The centers of curvature C of the plurality of inner tracks 51 to 56 may coincide with each other. The centers of curvature C of the plurality of inner tracks 51 to 56 may be defined as the centers of the inner pattern parts 51 to 56 and 61 to 65 or the center of the inner plane heating element 50.

The center of the inner plane heating element 50 may coincide with the center of the outer plane heating element 30 described above. In other words, the centers of curvature of the inner tracks 51 to 56, the centers of curvature of the base tracks 31A, 32A, and 33A, and the centers of curvature of the parallel tracks 31B, 32B, and 33B may coincide with each other.

The length of each of the plurality of inner tracks 51 to 56 may be different from each other. The widths W3 of the plurality of inner tracks 51 to 56 may be equal to each other.

The widths W3 of the inner tracks 51 to 56 may be different from the widths W1 of the base tracks 31A, 32A, and 33A and the widths W2 of the parallel tracks 31B, 32B, and 33B. In the present embodiment, the widths W3 of the inner tracks 51 to 56 may be wider than the widths W1 of the base tracks 31A, 32A, and 33A and the widths W2 of the parallel tracks 31B, 32B, and 33B, respectively. In addition, the widths W3 of the inner tracks 51 to 56 may be narrower than the sum of the widths W1 of the base tracks 31A, 32A, and 33A and the widths W2 of the parallel tracks 31B, 32B, and 33B.

The plurality of inner tracks 51 to 56 may be spaced apart from each other. More specifically, the plurality of inner tracks 51 to 56 may be spaced apart by a predetermined gap in the radial direction of the first imaginary circle CI. The gap between the inner tracks 51 to 56 adjacent to each other may be constant.

The gap g2 between the inner tracks 51 to 56 adjacent to each other are wider than the gap g1 between the base tracks 31A, 32A, and 33A and the parallel tracks 31B, 32B, and 33B, which are adjacent to each other.

The gap g2 between the inner tracks 51 to 56 adjacent to each other may be equal to or similar to the gap ga between the base tracks 31A, 32A, and 33A adjacent to each other or the gap gb between the parallel tracks 31B, 32B, and 33B adjacent to each other.

The plurality of inner tracks 51 to 56 may include the outermost inner track 51, the innermost inner track 56, and the middle inner tracks 52, 53, 54 and 55.

A pair of outermost inner tracks 51 may be provided. At least a pair of the middle inner tracks 52, 53, 54 and 55 may be provided. One innermost inner track 56 may be provided.

The middle inner tracks 52, 53, 54 and 55 may be located between the outermost inner track 51 and the innermost inner track 56 in the radial direction.

The outermost inner track 51 may be located inside the innermost outer track (the first base track 31A) of the outer plane heating element 30.

The outermost inner track 51 may be spaced apart from the first base track 31A in the radial direction of the first imaginary circle CI. The gap between the outermost inner track 51 and the first base track 31A may be constant.

The outermost inner track 51 may be referred to as the first inner track 51. In a case where four pairs of middle inner tracks 52, 53, 54 and 55 are provided as in the present embodiment, each of the middle inner tracks 52, 53, 54, and 55 may be referred to as the second inner track 52, the third inner track 53, the fourth inner track 54, and the fifth inner track 55, respectively, from the outside. In this case, the innermost inner track 56 may be referred to as the sixth inner track 56.

The plurality of inner bridges 61 to 65 may connect the plurality of inner tracks 51 to 56 with respect to the current flow direction in series.

The inner bridges 61 to 65 may connect the end parts of the inner tracks 51 to 56 adjacent to each other.

The plurality of inner bridges 61 to 65 may be spaced apart from each other.

The inner bridges 61 to 65 may smaller than the first base bridge 34A and the second parallel bridge 35B and may be larger than the second base bridge 35A and the first parallel bridge 34B. However, the size of the inner bridges are not limited thereto.

The widths of the inner bridges 61 to 65 may be the same as the widths W3 of the inner tracks 51 to 56. However, the widths of the inner bridges 61 to 65 are not limited thereto, and the widths of the inner bridges 61 to 65 may be narrower than the widths W3 of the inner tracks 51 to 56.

The thickness of the inner bridges 61 to 65 in the vertical direction (i.e., height) may be thicker than the thickness of the inner tracks 51 to 56 in the vertical direction in order to minimize the local heating generated by the difference in path between the inner circumference and the outer circumference of the inner bridges 61 to 65. As a result, the sectional area of the inner bridges 61 to 65 may be larger than the sectional area of the inner tracks 51 to 56, and the difference in resistance due to the path difference may be reduced, and thus the localized heating may be reduced. In one embodiment, the inner bridges 61 to 65 may be manufactured by being printed to the same thickness as that of the inner tracks 51 to 56, then being over-coated, or being printed at least twice. However, the process method is not limited thereto.

The plurality of inner bridges 61 to 65 may include a first inner bridge 61 to a fifth inner bridge 65. The first inner bridge 61 may connect the first inner track 51 and the second inner track 52 to each other. The second inner bridge 62 may connect the second inner track 52 and the third inner track 53 to each other. The third inner bridge 63 may connect the third inner track 53 and the fourth inner track 54 to each other. The fourth inner bridge 64 may connect the fourth inner track 54 and the fifth inner track 55 to each other. The fifth inner bridge 65 may connect the fifth inner track 55 and the sixth inner track 56 to each other.

A pair of first inner bridge 61 to a pair of fifth inner bridge 65 may be provided.

The pair of second electrode parts 69A and 69B may be connected to the inner pattern parts 51 to 56 and 61 to 65. The second electrode parts 69A and 69B may be directly connected to the inner pattern parts 51 to 56 and 61 to 65 or may be connected by a connector.

The pair of second electrode parts 69A and 69B may include a second positive electrode part 69A and a second negative electrode part 69B. One of the second positive electrode part 69A and the second negative electrode part 69B may be connected to the start point of the inner pattern parts 51 to 56 and 61 to 65, and the other thereof may be connected to the end point of the inner pattern parts 51 to 56 and 61 to 65.

In the present embodiment, the start point of the inner pattern parts 51 to 56 and 61 to 65 may be located at the end part of any one of the first inner tracks 51, and the end point of the inner pattern parts 51 to 56 and 61 to 65 may be located at the end part of the other first inner track 51. In other words, the pair of second electrode parts 69A and 69B may be connected to one end part of the first inner track 51 and the other end part of the inner track 51, respectively.

The widths of the second electrode parts 69A and 69B may be wider than the widths W3 of the inner tracks 51 to 56.

At least a part of the second electrode parts 69A and 69B may be located between the pair of first electrode parts 39A and 39B.

The inner plane heating element 50 may have a symmetrical shape with respect to an imaginary center line D bisecting the inner plane heating element 50. Here, the imaginary center line D may be an imaginary straight line passing through the center C of the inner plane heating element 50.

More specifically, the inner pattern parts 51 to 56 and 61 to 65 may have a shape symmetrical with respect to the imaginary center line D.

The pair of outermost inner tracks 51 may be located opposite to each other with respect to the imaginary center line D. A pair of middle inner tracks 52, 53, 54 and 55 having the same or similar radius of curvature may be located opposite to each other with respect to the imaginary center line D. The innermost inner track 56 may intersect the imaginary center line D. Each of the inner bridges 61 to 65 may be curved so as to protrude toward the imaginary center line D.

The pair of second electrode parts 69A and 69B may be located opposite to each other with respect to the imaginary center line D.

The electric heater 1 may be controlled in a single heating mode in which current is supplied to either the outer plane heating element 30 or the inner plane heating element 50 or in a dual heating mode in which current is supplied to both the outer plane heating element 30 and the inner plane heating element 50.

For example, in a case where the area of the heating object seated on the substrate 1 is small, the electric heater 1 may supply current only to the inner plane heating element 50 and may not supply current to the outer plane heating element 30. On the other hand, in a case where the area of the heating object seated on the substrate 1 is large, the electric heater 1 may supply current to each of the outer plane heating element 30 and the inner plane heating element 50.

In the present embodiment, the heating temperature of the outer plane heating element 30 in which the plurality of outer pattern parts are connected to the first electrode parts 39A and 39B may be higher than the heating temperature of the inner plane heating element 50. Accordingly, the heating temperature of the electric heater may be changed according to whether or not the electric current is supplied to any one of the outer plane heating element 30 and the inner plane heating element 50 in the single heating mode. Therefore, there is an advantage that the heating temperature of the electric heater may be adjusted.

Figure 5:
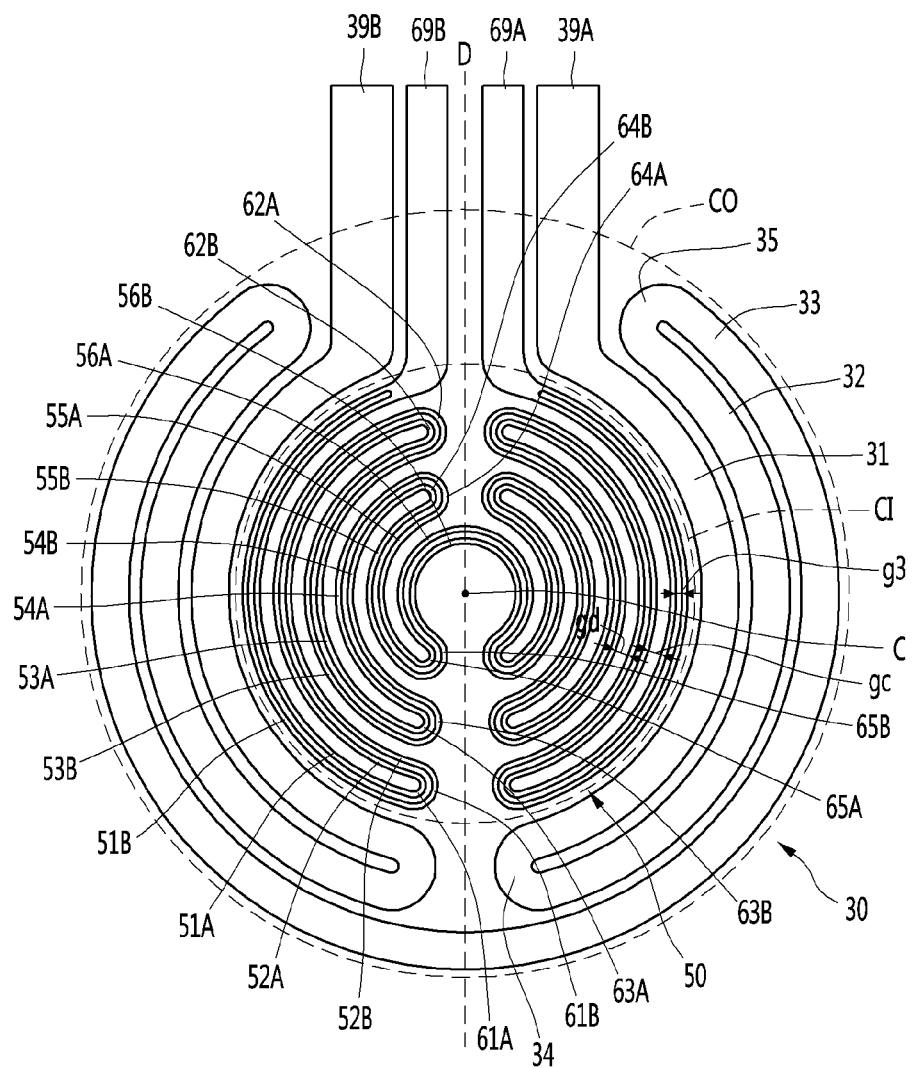
FIG. 5 is a bottom view showing an electric heater according to another embodiment of the present disclosure.

FIG. 5 is a bottom view showing an electric heater according to another embodiment of the present disclosure.

The electric heater according to the embodiment described with reference to FIG. 4 includes the outer plane heating element 30 including a plural of pattern parts connected in parallel to the first electrode parts 39A and 39B, whereas in the embodiment of FIG. 5, the electric heater includes the inner plane heating element 50 including a plural of pattern parts connected in parallel to the second electrode parts 69A and 69B.

In describing the embodiment of FIG. 5, descriptions that are the same or similar to that of the embodiment of FIG. 4 may be omitted in order to avoid duplicate description having the same or similar contents.

Referring to FIG. 5, the outer plane heating element 30 may include first electrode parts 39A and 39B, and outer pattern parts 31, 32, 33, 34, and 35 connected to the first electrode parts 39A and 39B.

The outer pattern parts 31 to 35 may be located between the first imaginary circle CI and the second imaginary circle CO. First inner pattern parts 51A to 56A and 61A to 65A and second inner pattern parts 51B to 56B and 61B to 65B to be described below may be located inside the first imaginary circle CI.

The outer pattern parts 31 to 35 may be connected and include a start point and an end point. The start point and the end point of the outer pattern parts 31 to 35 may be parts which are connected to the pair of first electrode parts 39A and 39B of the outer pattern parts 31 to 35, respectively.

The outer pattern parts 31 to 35 may include a plurality of outer tracks 31, 32 and 33 and a plurality of outer bridges 34 and 35 connecting the plurality of outer tracks 31, 32 and 33 in series.

Each of the outer tracks 31, 32, and 33 may be curved. More specifically, each of the outer tracks 31, 32, and 33 may have an arc shape. More specifically, each of the outer tracks 31, 32, and 33 may have a major arc shape having an arc angle of greater than 180 degrees, a minor arc shape having an arc angle of less than 180 degrees, or a semicircular shape having an arc angle of 180 degrees. In addition, it may be possible that each of the outer tracks 31, 32, and 33 may have a combination of two or more of the above-mentioned major arc shape, semicircular shape, and minor arc shape.

Through the combination of arc shapes, the outer tracks 31, 32, and 33 may be formed to be long in the circumferential direction of the second imaginary circle CO.

The centers of curvature C of the plurality of outer tracks 31, 32, and 33 may coincide with each other. The centers of curvature C of the outer tracks 31, 32 and 33 may be defined as the centers of the outer pattern parts 31 to 35 or the centers of the outer plane heating element 30.

The plurality of outer tracks 31, 32, and 33 may be spaced apart from each other. More specifically, the plurality of outer tracks 31, 32, and 33 may be spaced apart from each other by a predetermined gap in the radial direction of the second imaginary circle CO.

The plurality of outer tracks 31, 32 and 33 may include a first outer track 31, a second outer track 32 located outside the first outer track 31, and a third outer track 33 located outside the second outer track 32.

The first outer track 31 may be connected to the first electrode parts 39A and 39B.

A pair of first outer tracks 31 may be provided. At least a pair of second outer track 32 may be provided. One third outer track 33 may be provided. The second outer track 32 may be located between the first outer track 31 and the third outer track 33 in the radial direction.

The length of the second outer track 32 may be longer than the length of the first outer track 31 and may be shorter than the length of the third outer track 33.

The plurality of outer bridges 34 and 35 may connect the plurality of outer tracks 31, 32 and 33 in series with respect to the current flow direction.

The outer bridges 34 and 35 may connect end parts of the outer tracks 31, 32, and 33 adjacent to each other.

The plurality of outer bridges 34 and 35 may be spaced apart from each other.

The plurality of outer bridges 34 and 35 may include a first outer bridge 34 and a second outer bridge 35. The first outer bridge 34 may connect the first outer track 31 and the second outer track 32 to each other. The second outer bridge 35 may connect the second outer track 32 and the third outer track 33 to each other.

A pair of the first outer bridge 34 and a pair of the second outer bridge 35 may be provided.

The pair of first electrode parts 39A and 39B may be connected to the outer pattern parts 31 to 35. The first electrode parts 39A and 39B may be directly connected to the outer pattern parts 31 to 35 or may be connected by a connector.

One of the first positive electrode part 39A and the first negative electrode part 39B may be connected to the start point of the outer pattern parts 31 to 35 and the other thereof may be connected to the end point of the outer pattern parts 31 to 35.

In the present embodiment, the start point of the outer pattern parts 31 to 35 may be located at the end part of one first outer track 31 and the end point of the outer pattern parts 31 to 35 may be located at the end part of the other first outer track 31.

In other words, the end part of any one first outer track 31 are connected to the first positive electrode part 39A and the end part of the other first outer track 31 are connected to the first negative electrode part 39B.

At least a part of the first electrode parts 39A and 39B may be located between the pair of second outer bridges 35. More specifically, the first electrode parts 39A and 39B may pass between the pair of second outer bridges 35 and extend outside the second imaginary circle C2.

The second outer bridge 35 may be curved so as to protrude toward the first electrode parts 39A and 39B.

The distance between the pair of second outer bridges 35 may be wider than the distance between the pair of first outer bridges 34.

The outer pattern parts 31 to 35 may have a shape symmetrical with respect to the imaginary center line D.

The pair of first outer tracks 31 may be located opposite to each other with respect to the imaginary center line D. The pair of second outer tracks 32 may be located opposite to each other with respect to the imaginary center line D. The third outer track 33 may intersect the imaginary center line D.

The first outer bridge 34 may be curved so as to protrude toward the imaginary center line D.

The pair of first electrode parts 39A and 39B may be located opposite to each other with respect to the imaginary center line D.

The inner plane heating element 50 may include the second electrode parts 69A and 69B and a plurality of pattern parts connected in parallel to the second electrode parts 69A and 69B.

The inner plane heating element 50 may include second electrode parts 69A and 69B, first inner pattern parts 51A, 52A, 53A, 54A, 55A, 56A, 61A, 62A, 63A, 64A, and 65A connected to the second electrode parts 69A and 69B, and second inner pattern parts 51B, 52B, 53B, 54B, 55B, 56B, 61B, 62B, 63B, 64B, and 65B connected to the second electrode parts 69A and 69B in parallel with the first inner pattern parts 51A to 56A and 61A to 65A.

The first inner pattern parts 51A to 56A and 61A to 65A and the second inner pattern parts 51B to 56B and 61B to 65B may be located inside the first imaginary circle C1.

The first inner pattern parts 51A to 56A and 61A to 65A and the second inner pattern parts 51B to 56B and 61B to 65B may connect, respectively, and may include a start point and an end point, respectively. The start point and the end point of each of the first inner pattern parts 51A to 56A and 61A to 65A and the second inner pattern parts 51B to 56B and 61B to 65B according to the present embodiment may be parts which are connected a pair of second electrode parts 69A and 69B.

The first inner pattern parts 51A to 56A and 61A to 65A and the second inner pattern parts 51B to 56B and 61B to 65B may be formed to correspond to each other. The first inner pattern parts 51A to 56A and 61A to 65A and the second inner pattern parts 51B to 56B and 61B to 65B may not intersect each other.

The first inner pattern parts 51A to 56A and 61A to 65A and the second inner pattern parts 51B to 56B and 61B to 65B may be spaced apart from each other. A gap g3 between the first inner pattern parts 51A to 56A and 61A to 65A and the second inner pattern parts 51B to 56B and 61B to 65B may be kept constant according to the first inner pattern parts 51A to 56A and 61A to 65A and the second inner pattern parts 51B to 56B and 61B to 65B.

The first inner pattern parts 51A to 56A and 61A to 65A may include a plurality of base tracks 51A to 56A and a plurality of base bridges 61A to 65A connecting the plurality of base tracks 51A to 56A in series.

The second inner pattern parts 51B to 56B and 61B to 65B may include a plurality of parallel tracks 51B to 56B and a plurality of parallel bridges 61B to 65B connecting the plurality of parallel tracks 51B to 56B in series.

The base tracks 51A to 56A and the parallel tracks 51B to 56B may be integrated and referred to as inner tracks. The base bridges 61A to 65A and the parallel bridges 61B to 65B may be integrated and referred to as inner bridges.

Each of the base tracks 51A to 56A and the parallel tracks 51B to 56B may be curved. More specifically, each of the base tracks 51A to 56A and the parallel tracks 51B to 56B may have an arc shape. More specifically, each of the base tracks 51A to 56A and the parallel tracks 51B to 56B may have a major arc shape having an arc angle of greater than 180 degrees, a minor arc shape having an arc angle of less than 180 degrees, or a semicircular shape having an arc angle of 180 degrees. In addition, it may be possible for the base tracks 51A to 56A and the parallel tracks 51B to 56B to include a combination of two or more of the major arc shape, the semicircular shape, and the major arc shape.

Through the combination of arc shapes, the base tracks 51A to 56A and the parallel tracks 51B to 56B may be formed to be long in the circumferential direction of the first imaginary circle CI.

The centers of curvature C of the plurality of base tracks 51A to 56A and the plurality of parallel tracks 51B to 56B may coincide with each other. The centers of curvature C of the base tracks 51A to 56A and the parallel tracks 51B to 56B may be defined as the centers of the first inner pattern parts 51A to 56A and 61A to 65A and the second inner pattern parts 51B to 56B and 61B to 65B, or the center of the inner plane heating element 50.

The length of each of the plurality of base tracks 51A to 56A may be different from each other. The widths of the plurality of base tracks 51A to 56A may be equal to each other. The length of each of the plurality of parallel tracks 51B to 56B may be different from each other. The widths of the plurality of parallel tracks 51B to 56B may be equal to each other.

The widths of the base tracks 51A to 56A and the widths of the parallel tracks 51B to 56B may be the same or similar to each other.

The widths of the base tracks 51A to 56A and the widths of the parallel tracks 51B to 56B may be different from the widths of the outer tracks 31, 32, and 33.

The plurality of base tracks 51A to 56A and the plurality of parallel tracks 51B to 56B may be spaced apart from each other. More specifically, the plurality of base tracks 51A to 56A and the plurality of parallel tracks 51B to 56B may be spaced apart from each other by a predetermined gap in the radial direction of the second imaginary circle CO.

A potential difference between the parallel tracks 51B to 56B and the base tracks 51A to 56A adjacent to each other may be relatively small. On the other hand, the potential difference between the base tracks 51A to 56A adjacent to each other or the potential difference between parallel tracks 51B to 56B adjacent to each other may be relatively large. Accordingly, the gap g3 between the parallel tracks 51B to 56B and the base tracks 51A to 56A adjacent to each other may be narrower than each of the gap gc between the base tracks 51A to 56A adjacent to each other and the gap gd between the parallel tracks 51B to 56B adjacent to each other.

The plurality of base tracks 51A to 56A may include an outermost base track 51A, an innermost base track 56A, and a middle base track 52A, 53A, 54A, and 55A. In addition, the plurality of parallel tracks 51B to 56B may include an outermost parallel track 51B, an innermost parallel track 56B, and a middle parallel track 52B, 53B, 54B, and 55B.

A pair of outermost base track 51A and a pair of outermost parallel tracks 51B may be provided. At least one pair of middle base tracks 52A to 55A and at least one pair of middle parallel tracks 52B to 55B may be provided. One innermost base track 56A and one innermost parallel track 56B may be provided.

The middle base tracks 52A to 55A may be located between the outermost base track 51A and the innermost base track 56A in the radial direction. In addition, the middle parallel tracks 52B to 55B may be located between the outermost parallel track 51B and the innermost parallel track 56B in the radial direction.

The outermost base track 51A and the outermost parallel track 51B may be referred to as a first base track 51A and a first parallel track 51B, respectively. In a case where four pairs of the middle base tracks 52A to 55A and four pairs of the middle parallel tracks 52B to 55B are provided as in the present embodiment, each of the middle base tracks 52A to 55A may be referred to as the second base tracks 52A, the third base tracks 53A, the fourth base track 54A, and the fifth base track 55A and each of the middle parallel tracks 52B to 55B may be referred to as the second parallel track 52B, the third parallel tracks 53B, the fourth parallel track 54B, and a fifth parallel track 55B. In this case, the innermost base track 56A and the innermost parallel track 56B may be referred to as a sixth base track 56A and a sixth parallel track 56B, respectively.

The length of each of the base tracks 51A to 56A and the parallel tracks 51B to 56B may become shorter going towards the inner side.

The first base track 51A and the second base track 52A may be located between the first parallel track 51B and the second parallel track 52B. The second base track 52A may be located between the first base track 51A and the second parallel track 52B.

The second parallel track 52B and the third parallel track 53B may be located between the second base track 52A and the third base track 53A. The third parallel track 53B may be located between the second parallel track 52B and the third base track 53A.

The third base track 53A and the fourth base track 54A may be located between the third parallel track 53B and the fourth parallel track 54B. The fourth base track 54A may be located between the third base track 53A and the fourth parallel track 54B.

The fourth parallel track 54B and the fifth parallel track 55B may be located between the fourth base track 54A and the fifth base track 55A. The fifth parallel track 53B may be located between the fourth parallel track 54B and the fifth base track 55A.

The fifth base track 55A and the sixth base track 56A may be located between the fifth parallel track 55B and the sixth parallel track 56B. The sixth base track 56A may be located between the fifth base track 55A and the sixth parallel track 56B.

The plurality of base bridges 61A to 65A may connect the plurality of base tracks 51A to 56A in series with respect to the current flow direction. The plurality of parallel bridges 61B to 65B may connect the plurality of parallel tracks 51B to 56B in series with respect to the current flow direction.

The base bridges 61A to 65A may connect end parts of the base tracks 51A to 56A adjacent to each other. The parallel bridges 61B to 65B may connect end parts of parallel tracks 51B to 56B adjacent to each other.

The plurality of base bridges 61A to 65A and the plurality of parallel bridges 61B to 65B may be spaced apart from each other.

The widths of the base bridges 61A to 65A may be equal to or narrower than the widths of the base tracks 51A to 56A.

The widths of the parallel bridges 61B to 65B may be equal to or narrower than the widths of the parallel tracks 51B to 56B.

When comparing the above configuration with a configuration where the base bridges 61A to 65A and the parallel bridges 61B to 65B form an integral inner bridge without being spaced apart from each other, in the above configuration, the path difference between the inner circumference and the outer circumference of each of the base bridges 61A to 65A and the parallel bridges 61B to 65B may be relatively reduced. Therefore, the localized heating of the base bridges 61A to 65A and the parallel bridges 61B to 65B may be reduced.

In addition, when comparing with a configuration where the first inner pattern parts 51A to 56A and 61A to 65A and the second inner pattern parts 51B to 56B and 61B to 65B are not spaced apart from each other and an integral inner pattern part is formed, in the above configuration, the width of each of the first inner pattern parts 51A to 56A and 61A to 65A and the second inner pattern parts 51B to 56B and 61B to 65B may be reduced. Accordingly, when current is supplied to the second electrode parts 69A and 69B, the heating value of the first inner pattern parts 51A to 56A and 61A to 65A and the second inner pattern parts 51B to 56B and 61B to 65B may be somewhat reduced, but the heating temperature may be relatively high.

The plurality of base bridges 61A to 65A may include a first base bridge 61A, a second base bridge 62A, a third base bridge 63A, a fourth base bridge 64A, and a fifth base bridge 65A. The first base bridge 61A may connect the first base track 51A and the second base track 52A. The second base bridge 62A may connect the second base track 52A and the third base track 53A to each other. The third base bridge 63A may connect the third base track 53A and the fourth base track 54A to each other. The fourth base bridge 64A may connect the fourth base track 54A and the fifth base track 55A to each other. The fifth base bridge 65A may connect the fifth base track 55A and the sixth base track 56A to each other.

The plurality of parallel bridges 61B to 65B may include a first parallel bridge 61B, a second parallel bridge 62B, a third parallel bridge 63B, a fourth parallel bridge 64B, and a third parallel bridge 65B. The first parallel bridge 61B may connect the first parallel track 51B and the second parallel track 52B to each other. The second parallel bridge 62B may connect the second parallel track 52B and the third parallel track 53B to each other. The third parallel bridge 63B may connect the third parallel track 53B and the fourth parallel track 54B to each other. The fourth parallel bridge 64B may connect the fourth parallel track 54B and the fifth parallel track 55B to each other. The fifth parallel bridge 65B may connect the fifth parallel track 55B and the sixth parallel track 56B to each other.

A pair of first base bridge 61A to a pair of fifth base bridge 65A and a pair of first parallel bridge 61B to a pair of fifth parallel bridge 65B may be provided, respectively.

The first parallel bridge 61B may be spaced apart from the first base bridge 61A and may surround the first base bridge 61A. The length of the first parallel bridge 61B may be longer than the length of the first base bridge 61A.

The second base bridge 62A may be spaced apart from the second parallel bridge 62B and may surround the second parallel bridge 62B. The length of the second base bridge 62A may be longer than the length of the second parallel bridge 62B.

The third parallel bridge 63B may be spaced apart from the third base bridge 63A and may surround the third base bridge 63A. The length of the third parallel bridge 63B may be longer than the length of the third base bridge 63A.

The fourth base bridge 64A may be spaced apart from the fourth parallel bridge 64B and may surround the fourth parallel bridge 64B. The length of the fourth base bridge 64A may be longer than the length of the fourth parallel bridge 64B.

The fifth parallel bridge 65B may be spaced apart from the fifth base bridge 65A and may surround the fifth base bridge 65A. The length of the fifth parallel bridge 65B may be longer than the length of the fifth base bridge 65A.

The pair of second electrode parts 69A and 69B may be respectively connected to the first inner pattern parts 51A to 56A and 61A to 65A and the second inner pattern parts 51B to 56B and 61B to 65B. The second electrode parts 69A and 69B may be directly connected to the first inner pattern parts 51A to 56A and 61A to 65A and the second inner pattern parts 51B to 56B and 61B to 65B or may be connected to the first inner pattern parts 51A to 56A and 61A to 65A and the second inner pattern parts 51B to 56B and 61B to 65B by a connector.

Either one of the second positive electrode part 69A and the second negative electrode part 69B may be connected to the start point of each of the first inner pattern parts 51A to 56A and 61A to 65A and the second inner pattern parts 51B to 56B and 61B to 65B and the other one thereof may be connected to the end point of each of the first inner pattern parts 51A to 56A and 61A to 65A and the second inner pattern parts 51B to 56B and 61B to 65B.

In the present embodiment, the start point of the first inner pattern parts 51A to 56A and 61A to 65A may be located at the end part of any one first base track 51A, and the end point of the first inner pattern parts 51A to 56A and 61A to 65A may be located at the end part of the other first base track 51A. In addition, the start point of the second inner pattern parts 51B to 56B and 61B to 65B may be located at the end part of any one of the first parallel tracks 51B and the end point of the second inner pattern parts 51B to 56B and 61B to 65B may be located at the end part of the other first parallel track 51B.

In other words, the end part of one first base track 51A and one first parallel track 51B are connected to the second positive electrode part 69A, and the end part of the other first base track 51A and the other of the first parallel tracks 51B may be connected to the second negative electrode part 69B.

The width of the second electrode parts 69A and 69B may be wider than the sum of the widths of the base tracks 51A to 56A and the widths of the parallel tracks 51B to 56B.

Each of the first inner pattern parts 51A to 56A and 61A to 65A and the second inner pattern parts 51B to 56B and 61B to 65B may have a shape symmetrical with respect to the imaginary center line D.

The pair of outermost base tracks 51A may be located opposite to each other with respect to the imaginary center line D. The pair of outermost parallel tracks 51B may be located opposite to each other with respect to the imaginary center line D.

The pair of middle base tracks 52A to 55A having the same or similar radius of curvature may be located opposite to each other with respect to the imaginary center line D. A pair of the middle parallel tracks 52B to 55B having the same or similar radius of curvature may be located opposite to each other with respect to the imaginary center line D.

The innermost base track 56A and the innermost parallel track 56B may intersect the imaginary center line D. Each of the base bridges 61A to 65A and the parallel bridges 61B to 65B may be curved so as to protrude toward the imaginary center line D.

In the present embodiment, the heating temperature of the inner plane heating element 50 in which the plurality of inner pattern parts are connected to the second electrode parts 69A and 69B may be higher than the heating temperature of the outer plane heating element 30. Therefore, the heating temperature of the electric heater may be changed according to whether or not current is supplied to which one of the outer planar heating element 30 and inner planar heating element 50 in the single heating mode. Therefore, there is an advantage that the heating temperature of the electric heater may be adjusted.

While embodiments of the present disclosure have been described above with reference to the drawings, the present invention is not limited to the above-described embodiments, and it will be apparent to those skilled in the art that the embodiments may be modified without departing from the spirit and scope of the present invention. It will be understood that modifications and variations are possible. Therefore, the scope of the present invention should not be defined by the described embodiments, but should be determined by the technical spirit described in the claims.

What is claimed is:

1. An electric heater comprising:
   a substrate;
   a first outer pattern part disposed on one surface of the substrate and to connect with a pair of first electrodes;
   a second outer pattern part to connect with the pair of first electrodes in parallel with the first outer pattern part and to be spaced apart from the first outer pattern part; and
   an inner pattern part disposed on the one surface of the substrate so as to be located such that the first outer pattern part and the second outer pattern part surround the inner pattern part, to be spaced apart from the first outer pattern part and the second outer pattern part, and to connect with a pair of second electrodes spaced apart from the pair of first electrodes.

2. The electric heater of claim 1,
   wherein a width of each of the first outer pattern part and the second outer pattern part is narrower than a width of the inner pattern part.

3. The electric heater of claim 1,
   wherein a gap between the first outer pattern part and the second outer pattern part is constant.

4. The electric heater of claim 1,
   wherein the first outer pattern part includes:
   a first base track connected to one of the pair of first electrodes;
   a second base track spaced apart from the first base track; and
   a first base bridge connecting the first base track and the second base track in series; and
   wherein the second outer pattern part includes:
   a first parallel track connected to the one of the pair of first electrodes and located between the first base track and the second base track;
   a second parallel track spaced apart from the first parallel track and located between the first parallel track and the second base track; and
   a first parallel bridge connecting the first parallel track and the second parallel track in series.

5. The electric heater of claim 4,
   wherein the length of the first base bridge is longer than the length of the first parallel bridge.

6. The electric heater of claim 4,
wherein a gap between the first parallel track and the second parallel track is greater than a gap between the first base track and the first parallel track and a gap between the second base track and the second parallel track.

7. The electric heater of claim 4,
wherein the first outer pattern part further includes:
  a third base track spaced apart from the second base track; and
  a second base bridge connecting the second base track and the third base track in series, and
wherein the second outer pattern part further includes:
a third parallel track located opposite the second parallel track with respect to the third base track; and
a second parallel bridge which connects the second parallel track and the third parallel track in series.

8. The electric heater of claim 7,
wherein the length of the second base bridge is shorter than the length of the second parallel bridge.

9. The electric heater of claim 7,
wherein the first base bridge is spaced apart from the first parallel bridge and surrounds the first parallel bridge, and
wherein the second parallel bridge is spaced apart from the second base bridge and surrounds the second base bridge.

10. The electric heater of claim 7,
wherein a gap between the second base track and the third base track is greater than a gap between the second base track and the second parallel track and a gap between the third base track and the third parallel track.

11. The electric heater of claim 7,
wherein the second base bridge and the second parallel bridge are curved to protrude toward the one of the pair of first electrodes.

12. The electric heater of claim 7,
wherein the first base track, the second base track, the first parallel track, and the second parallel track are located at both sides of an imaginary center line across a center of the outer pattern part or the inner pattern part, and
wherein the third base track and the third parallel track intersect the imaginary center line.

13. The electric heater of claim 12,
wherein a distance between the pair of second parallel bridges located on both sides of the imaginary center line is farther than a distance between the pair of first base bridges located on both sides of the imaginary center line.

14. The electric heater of claim 1,
wherein the inner pattern part is located inside a first imaginary circle, and
wherein the first outer pattern part and the second outer pattern part are located between the first imaginary circle and a second imaginary circle having a larger diameter than the first imaginary circle.

15. An electric heating apparatus including the electric heater of claim 1.

16. An electric heater comprising:
a substrate;
an outer pattern part disposed on one surface of the substrate and to connect with a pair of first electrodes;
a first inner pattern part disposed on the one surface of the substrate so as to be located such that the outer pattern part surrounds the first inner pattern part, to be apart from the outer pattern part, and to connect with a pair of second electrodes spaced apart from the pair of first electrodes; and
a second inner pattern part to connect with the pair of second electrodes in parallel with the first inner pattern part and to be spaced apart from the first inner pattern part.

17. The electric heater of claim 16,
wherein the first inner pattern part and the second inner pattern part are located inside a first imaginary circle, and
wherein the outer pattern part is located between the first imaginary circle and a second imaginary circle having a larger diameter than the first imaginary circle.

18. The electric heater of claim 16,
wherein a width of each of the first inner pattern part and the second inner pattern part is narrower than a width of the outer pattern part.

19. The electric heater of claim 16,
wherein a gap between the first inner pattern part and the second inner pattern part is constant.

20. An electric heating apparatus including the electric heater of claim 16.

* * * * *